US012217652B2

(12) United States Patent
Zhang et al.

(10) Patent No.: US 12,217,652 B2
(45) Date of Patent: Feb. 4, 2025

(54) DISPLAY MODULE, CONTROL METHOD AND APPARATUS, ELECTRONIC DEVICE, AND STORAGE MEDIUM

(71) Applicants: Chengdu BOE Optoelectronics Technology Co., Ltd., Sichuan (CN); BOE Technology Group Co., Ltd., Beijing (CN)

(72) Inventors: Chang Zhang, Beijing (CN); Yong Yu, Beijing (CN); Yuanyuan Chai, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,988

(22) PCT Filed: Jun. 8, 2021

(86) PCT No.: PCT/CN2021/098959
§ 371 (c)(1),
(2) Date: Oct. 28, 2022

(87) PCT Pub. No.: WO2022/022078
PCT Pub. Date: Feb. 3, 2022

(65) Prior Publication Data

US 2023/0196968 A1 Jun. 22, 2023

(30) Foreign Application Priority Data

Jul. 27, 2020 (CN) ........................ 202010733448.X

(51) Int. Cl.
*G09G 3/20* (2006.01)
*G09G 3/3225* (2016.01)

(52) U.S. Cl.
CPC ......... *G09G 3/2092* (2013.01); *G09G 3/3225* (2013.01); *G09G 2330/02* (2013.01); *G09G 2330/021* (2013.01); *G09G 2330/028* (2013.01)

(58) Field of Classification Search
CPC ............... G09G 3/2092; G09G 3/3225; G09G 2330/021; G09G 2330/028; G09G 2330/02; G09F 9/30
See application file for complete search history.

(56) References Cited

U.S. PATENT DOCUMENTS

2014/0320075 A1* 10/2014 Baurle .................... G06F 1/263 320/108
2019/0130831 A1* 5/2019 Tan .......................... H03K 3/02
(Continued)

FOREIGN PATENT DOCUMENTS

CN 102426816 A 4/2012
CN 205510137 U 8/2016
(Continued)

OTHER PUBLICATIONS

International Search Report for PCT/CN2021/098959 Mailed Aug. 30, 2021.
(Continued)

*Primary Examiner* — Douglas M Wilson
(74) *Attorney, Agent, or Firm* — Ling Wu; Stephen Yang; Ling and Yang Intellectual Property

(57) ABSTRACT

A display module (10), including a drive IC (11) and a power management IC (12). The power management IC (12) comprises a first identification pin (121); the first identification pin (121) is connected to the drive IC (11); under the condition that the power management IC (12) is turned on, the power management IC (12) transmits identification information to the drive IC (11) by means of the first identification pin (121), so that the drive IC (11) identifies
(Continued)

10 the power management IC (12) and is paired with the power management IC (12). A control method, a control apparatus (200), an electronic device (100) and a computer readable storage medium (40).

8 Claims, 6 Drawing Sheets

(56) References Cited

U.S. PATENT DOCUMENTS

2020/0219440 A1 7/2020 Baek
2021/0248939 A1* 8/2021 Ahn ..................... G09G 3/2092

FOREIGN PATENT DOCUMENTS

CN 107610650 A 1/2018
CN 108666355 A 10/2018
CN 109584769 A 4/2019
CN 111192556 A 5/2020
CN 111276098 A 6/2020
CN 111696445 A * 9/2020 ............... G09F 9/30
KR 10-2018-0039498 A 4/2018
WO WO-2022022078 A1 * 2/2022 ............... G09F 9/30

OTHER PUBLICATIONS

Office Action dated Sep. 17, 2021 for Chinese Patent Application No. 202010733448.X and English Translation.
Office Action dated Mar. 17, 2022 for Chinese Patent Application No. 202010733448.X and English Translation.
Decision of Rejection dated Aug. 5, 2022 for Chinese Patent Application No. 202010733448.X and English Translation.
Zhizhong Wang, Electrical and Electronic Engineering (2nd edition), Dec. 31, 2017, pp. 299-300.

* cited by examiner

| Quantity of pulses | Output voltage | Quantity of pulses | Output voltage |
|---|---|---|---|
| 1 | −5. 4V | 7 | −4. 8V |
| 2 | −5. 3V | 8 | −4. 7V |
| 3 | −5. 2V | 9 | −4. 6V |
| 4 | −5. 1V | 10 | −4. 5V |
| 5 | −5. 0V | 11 | −4. 4V |
| 6 | −4. 9V | 12 | −4. 3V |

FIG. 4

DISPLAY MODULE, CONTROL METHOD AND APPARATUS, ELECTRONIC DEVICE, AND STORAGE MEDIUM

CROSS-REFERENCE TO RELATED APPLICATIONS

This application is a national stage application of PCT Application No. PCT/CN2021/098959, which is filed on Jun. 8, 2021 and claims priority to the Chinese Patent Application No. CN202010733448.X, filed on Jul. 27, 2020, to the China National Intellectual Property Administration, which is incorporated herein by reference in its entity.

TECHNICAL FIELD

The present application relates to the display field, in particular to a display module, a control method, an apparatus, an electronic device and a storage medium.

BACKGROUND

At present, pairing of a Power Management IC (PMIC) and a Drive IC (DIC) on a display module not only requires pin to pin in hardware, but also requires being compatible with a corresponding software driver. However, the design, process and other factors of different manufacturers easily lead to incompatibility between the power management ICs and the drive ICs produced by different manufacturers.

SUMMARY

The present disclosure provides a display module, a control method, an apparatus, an electronic device, and a storage medium.

The present application provides a display module including a drive IC and a power management IC.

The power management IC includes a first identification pin, and the first identification pin is connected to the drive IC.

When the power management IC is turned on, the power management IC transmits identification information to the drive IC through the first identification pin to enable the drive IC to identify the power management IC and pair with the power management IC.

In some implementations, the drive IC further includes: an enable pin, which is connected with the power management IC, wherein the drive IC transmits an enable signal to the power management IC through the enable pin to turn on the power management IC.

In some implementations, the drive IC further includes a second identification pin, which is connected to the first identification pin and is used to receive the identification information transmitted by the first identification pin.

In some implementations, the drive IC includes: a plurality of storage registers, which correspond to a plurality of the power management ICs, respectively, wherein each of the storage registers stores a look up table paired with corresponding power management IC.

In some implementations, the drive IC further includes: a control signal transmitting pin, which is connected to the power management IC, wherein the drive IC generates a control signal according to the identification information of the power management IC and transmits the control signal to the power management IC through the control signal transmitting pin.

In some implementations, the power management IC further includes: a plurality of power supply pins, and the power management IC determines an output signal according to the control signal and supplies power to the drive IC through a plurality of the power supply pins.

The present application also provides a control method for controlling the pairing of a drive IC and a power management IC, and the control method includes the following acts: controlling the drive IC to transmit an enable signal to the power management IC to turn on the power management IC; receiving the identification information transmitted by the power management IC; and generating a control signal according to the identification information and controlling the drive IC to transmit the control signal to the power management IC to control the power management IC to supply power to the drive IC.

The present application also provides a control apparatus for controlling the pairing of a drive IC and a power management IC, and the control apparatus includes: a first control module, which controls the drive IC to transmit an enable signal to the power management IC to turn on the power management IC; a receiving module, which is used to receive identification information transmitted by the power management IC; and a second control module, which is used to generate a control signal according to the identification information and control the drive IC to transmit the control signal to the power management IC to control the power management IC to supply power to the drive IC.

The application also provides an electronic device, which includes one or more processors and memories; and one or more programs, which are stored in the memory and executed by the one or more processors, and the programs comprise instructions for executing a control method of a claim.

The present application provides a non-volatile computer-readable storage medium containing computer-executable instructions that, when executed by one or more processors, cause the processor to perform a control method.

According to the display module, the control method, the control apparatus, the electronic device and the computer readable storage medium, the power management IC is connected to the drive IC through the first identification pin, therefore, the corresponding identification information can be transmitted to the drive IC through the first identification pin, so that the drive IC can identify the corresponding drive IC according to the identification information, thus achieving compatibility between the drive ICs and the power management ICs produced by different manufacturers, reducing the risk of the supply chain and saving the cost.

Additional aspects and advantages of the present application will be partially shown or become apparent in the following description, or will be learned from practice of the present application.

BRIEF DESCRIPTION OF DRAWINGS

The above mentioned and/or additional aspects and advantages of the present application will become apparent and easy to understand from the following description of implementations in conjunction with accompanying drawings.

FIG. 4 is a schematic diagram of a corresponding relationship between a quantity of pulses and an output voltage in an LUT of a power management module according to an implementation of the present application.

Figure 1:
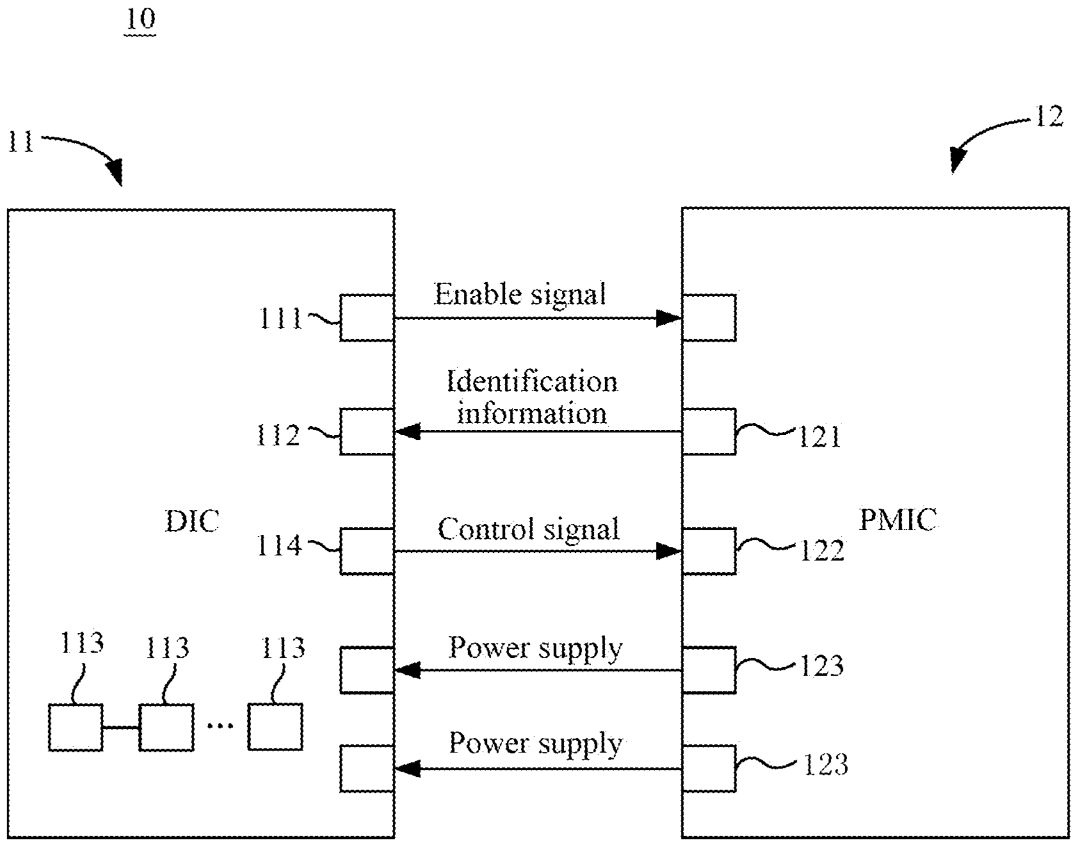
FIG. 1 is a schematic diagram of modules of a display module according to an implementation of the present application.

DESCRIPTION OF MAIN COMPONENT SYMBOLS display module 10, drive IC 11, enable pin 111, second identification pin 112, storage register 113, control signal transmitting pin 114, power management IC 12, first identification pin 121, control signal receiving pin 122, power supply pin 123, processor 20, memory 30, program 32, computer readable storage medium 40, first control module 12, receiving module 14, second control module 16; electronic device 100, control apparatus 200.

DETAILED DESCRIPTION

Descriptions will now be made in detail to implementations of the present application, and examples of the implementations are shown in the accompanying drawings. The same or similar, or functionally same or similar elements are indicated by like reference numerals throughout the descriptions. The implementations described herein with reference to the accompanying drawings are exemplary, and intended to explain the present application only, but should not be construed to limit the present application.

In the description of the present application, it should be understood that orientation or position relationships indicated by terms "center", "longitudinal", "transverse", "length", "width", "thickness", "upper", "lower", "front", "back", "left", "right", "vertical", "horizontal", "top", "bottom", "inside", "outside", "clockwise", "counterclockwise" and the like are based on the orientation or position relationships shown in the drawings, and are for the convenience of description of the present application and simplification of the description only, but are not intended to indicate or imply that the mentioned apparatus or element must have a specific orientation, or be constructed and operated in a particular orientation, and therefore they should not be construed as limitation on the present application. In addition, the terms "first" and "second" are used for descriptive purposes only and cannot be interpreted as indicating or implying relative importance or implicitly indicating the number of technical features indicated. Therefore, a feature defined by "first" and "second" may explicitly or implicitly indicate inclusion of one or more such features. In the description of the present application, the meaning of "a plurality of" is two or more than two, unless defined otherwise explicitly.

In the description of the present application, it should be noted that unless otherwise specified and limited, the terms "mount", "connected" and "connect" should be understood in a broad sense. For example, a connection may be fixed connection, detachable connection or integrated connection, may be mechanical connection, electrical connection or communicable, or may be direct connection, indirect connection through intermediate medium, communication inside two elements, or interaction between the two elements. For those of ordinary skill in the art, the specific meaning of the above terms in the present application may be understood according to specific situations.

The following disclosure provides many different implementations or examples for implementing different constructions of the present application. In order to simplify the disclosure of the present application, components and arrangements of specific examples are described below, while they are only by way of example and are not intended to limit the present application. Further, reference numbers and/or reference letters in different examples may be repeated in the present application for the purposes of simplicity and clarity and does not per se indicate the relationship between the various implementations and/or arrangements discussed. In addition, examples of various specific processes and materials are provided in the present application, but those of ordinary skill in the art will be aware of the application of other processes and/or the use of other materials.

With the continuous development of display screen technology, the integration level of display screen is increasingly higher. In order to reduce the risk of supply chain to parts of display screens and the consideration of corresponding cost control, usually, manufacturers who assemble display screens choose multiple suppliers to supply some important parts, while the design and process of the parts from different suppliers may be different, which makes brand dichotomization a restrictive factor. For example, Drive ICs (DIC's) and Power Management ICs (PMIC's) in display screens may be in different sizes and software drivers due to the design, process and other factors of different manufacturers, which easily leads to incompatibility between the power management ICs and the drive ICs produced by different manufacturers.

Referring to FIG. 1, in view of this, the present application provides a display module 10 that includes a drive IC 11 and a power management IC 12, and the power management IC 12 includes a first identification pin 121, and the first identification pin 121 is connected to the drive IC 11.

In a case where the power management IC 12 is turned on, the power management IC 12 transmits identification information to the drive IC 11 through the first identification pin 121 so that the drive IC 11 identifies the power management IC 12 and is paired with the power management IC 12.

In the display module 10 of the present application, the power management IC 12 is connected to the drive IC 11 through the first identification pin 121, so that when the power management IC 12 is paired with the drive IC 11, corresponding identification information can be transmitted to the drive IC 11 through the first identification pin 121, and the drive IC 11 can be paired with the drive IC 11 according to the identification information. In this way, compatibility between the drive IC 11 and the power management IC 12 produced by different manufacturers is achieved, reducing the risk of the supply chain and saving the cost.

The display module 10 may be displayed using an Active-matrix Organic Light-emitting Diode (AMOLED) panel. The power management IC 12 is electrically connected to the active-matrix organic light-emitting diode panel through the drive IC 11. The power management IC 12 is used to supply power to the active-matrix organic light-emitting diode panel, and the drive IC 11 is used to drive the active-matrix organic light emitting diode panel to display. Displaying of the active-matrix organic light emitting diode panel of the display module 10 can achieve autonomous light emitting, can achieve customized driving for pixel points, can achieve display function without backlight, and has the characteristics of low energy consumption, wide viewing angle, high refresh rate, thin size and the like.

It should be noted that both the drive IC 11 and the power management IC 12 may be Integrated Circuit (IC) ICs, and the drive IC 11 may be electrically connected to the power management IC 12 by bonding pin. The identification information refers to identity information used to characterize the type or brand of the power management IC. Each type of power management IC 12 or each brand of power management IC 12 includes corresponding identification information, and the drive IC 11 can identify the type, brand or the like of the power management IC 12 based on the identification information.

Specifically, the power management IC 12 includes a first identification pin 121, and the drive IC 11 includes a second identification pin 112. When the power management IC 12 is assembled with the drive IC 11, the first identification pin 121 is connected to the second identification pin 112. The power management IC 12 includes corresponding identification information. When the power management IC 12 is activated, the identification information is transmitted to the second identification pin 112 through the first identification pin 121, so that the drive IC 11 can match the power management IC 12 according to the identification information. In this way, incompatibility of the drive IC 11 with the power management IC 12 is avoided.

Figure 2:
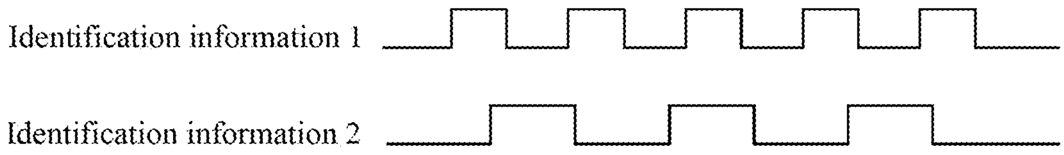
FIG. 2 is a schematic diagram of identification information according to an implementation of the present application.

It should be noted that the identification information may be recorded by the manufacturer when the power management IC 12 is designed or manufactured. Referring to FIG. 2, the identification information may be a pulse signal, and a quantity of pulses or a width of pulses in the identification information of the drive IC 11 of different types or brands are different. The drive IC 12 can determine the type or brand of the power management IC 12 based on the quantity and the width of pulses in the pulse signal. In the present application, the drive IC 11 can determine the type or brand of the power management IC 12 connected thereto based on the quantity of pulses in the pulse signal. For example, in some examples, a power management IC A includes identification information 1 in which the quantity of pulses is 5, and a power management IC B includes identification information 2 in which the quantity of pulses is 3. If the power management IC A is connected to the drive IC 11, the drive IC 11 can identify the power management IC A according to the quantity of pulses in the identification information.

In some implementations, the drive IC 11 includes an enable pin 111 connected to the power management IC 12, the drive IC 11 transmits an enable signal to the power management IC 12 through the enable pin 111 to turn on the power management IC 12.

Thus, the drive IC 11 can transmit the enable signal to the power management IC 12 through the enable pin 111, and the power management IC 12 can be turned on when receiving the enable signal, so that the identification signal can be transmitted to the second identification pin 112 through the first identification pin 121, so that the drive IC 11 can be matched with the power management IC 12.

In some implementations, the drive IC 11 includes a plurality of storage registers 113 corresponding to a plurality of power management ICs 12, respectively, each of the storage registers 113 stores a Look Up Table (LUT) paired with the corresponding power management IC 12.

Specifically, each power management IC 12 includes an LUT. It will be understood that LUTs in power management ICs 12 of different manufacturers may differ. In order for the drive IC 11 to be compatible with the power management ICs 12, an LUT of the drive IC 11 must be able to match an LUT of any power management IC 12. Thus the drive IC 11 is provided with a plurality of storage registers, 113 each of which stores an LUT paired with an LUT of a corresponding power management IC 12. Therefore, in a process of pairing the drive IC 11 with the power management IC 12, the drive IC 11 can select the LUT in the corresponding storage register 113 to pair with the LUT of the power management IC 12 after identifying the power management IC 12 according to the identification information, thereby ensuring compatibility between the drive IC 11 and different power management ICs 12.

In some implementations, the drive IC 11 further includes a control signal transmitting pin 114 connected to the power management IC 12, and the drive IC 11 generates a control signal (Swire signal) according to the identification information of the power management IC 12 and transmits the control signal to the power management IC 12 through the control signal transmitting pin 114.

Specifically the power management IC 12 further includes a corresponding control signal receiving pin 122 connected to the control signal transmitting pin 114. After the drive IC 11 receives the identification signal of the power management IC 12 and is paired with the power management IC 12, the LUT of the drive IC 11 can generate a control signal according to the identification signal, and the control signal transmitting pin 114 transmits the control signal to the control signal receiving pin 122, so that the power management IC 12 can execute corresponding operations according to the control signal.

In some implementations, the power management IC 12 further includes a plurality of power supply pins 123, and the power management IC 12 determines a voltage of each power supply pin 123 according to the control signal and supplies power to the drive IC 11 through the plurality of power supply pins 123.

Figure 3:
FIG. 3 is a schematic diagram of a control signal according to an implementation of the present application.

Referring to FIG. 3, it should be noted that the control signal includes a plurality of successive pulse signals, each of which includes a predetermined quantity of pulses. The plurality of pulse signals corresponds to a plurality of power supply pins 123, respectively, and each pulse signal controls an output voltage of a corresponding power supply pin 123. For example, in some examples, the control signal includes three successive pulse signals, namely a pulse signal A, a pulse signal B, and a pulse signal C. The power management IC 12 includes a power supply pin a, a power supply pin b and a power supply pin c, wherein, the pulse signal A corresponds to the power supply pin a for controlling an output voltage of the power supply pin a, the pulse signal B corresponds to the power supply pin b for controlling an output voltage of the power supply pin b, and the pulse signal C corresponds to the power supply pin c for controlling an output voltage of the power supply pin c. It can be understood that the power management IC 12 includes a plurality of power supply pins 123 which are connected to the drive IC 11 since type, quantity and magnitude of voltages required by different active-matrix organic light emitting diode panels may differ. The specific quantity of the power supply pins 123 is not restrictive. For example, the quantity of the power supply pins 123 may be 2, 3, 5, 6 or even more.

Referring to FIG. 4, specifically, the LUT in each power management IC 12 includes a mapping relationship between the quantity of pulses and the output voltage of the power supply pin 123. For example, refer to FIGS. 3 and 4 together. In some examples, if the quantity of pulses of three successive pulse signals in the control signal is 5, 6 and 7, respectively, the output voltages of three power supply pins 123 in the LUT of the voltage management IC are −5.0 V, −4.9 V and −4.8 V, respectively. When the power management IC 12 receives the control signal, the power management IC 12 can adjust the voltage of the corresponding power supply pin 123 to match the voltage corresponding to the quantity of pulses in the LUT according to the quantity of pulses in each pulse signal, so that the power supply pin 123 supplies power to the drive IC 11 with the adjusted output voltage.

Figure 5:
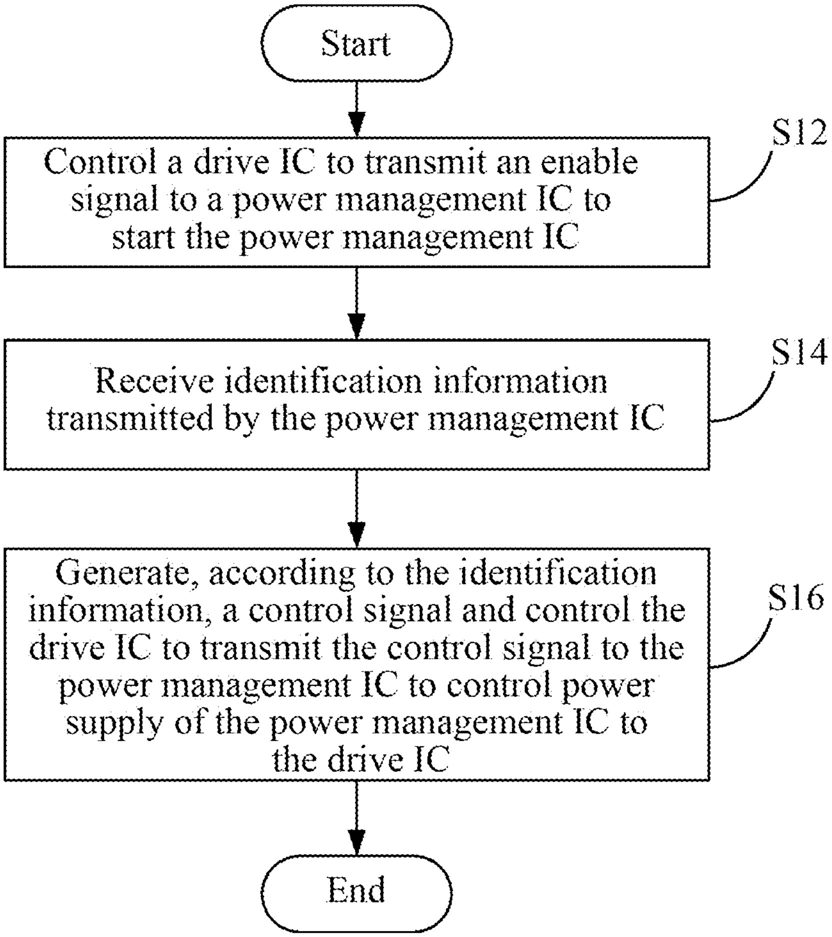
FIG. 5 is a flow diagram of a control method according to some implementations of the present application.

Referring to FIG. 5, the present application also provides a control method for controlling the pairing of the drive IC 11 and the power management IC 12. The control method includes acts S12 to S16.

In S12, a drive IC is controlled to transmit an enable signal to the power management IC to turn on the power management IC.

In S14, the identification information transmitted by the power management IC is received.

In S16, a control signal is generated according to the identification information and the drive IC is controlled to transmit the control signal to the power management IC to control the power management IC to supply power to the drive IC.

Figure 6:
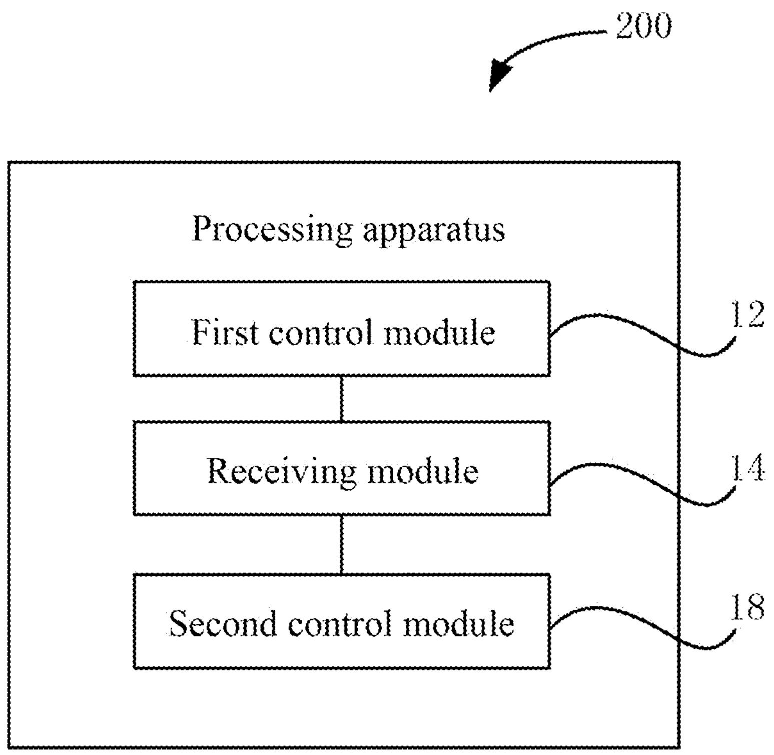
FIG. 6 is a schematic diagram of modules of a control apparatus according to some implementations of the present application.

Also referring to FIG. 6, a control apparatus 200 is provided in an implementation of the present application. The control apparatus 200 includes a first control module 12, a receiving module 14 and a second control module 16.

The act S12 may be implemented by the first control module 12, the act S14 may be implemented by the receiving module 14, and the act S16 may be implemented by the second control module 16. Alternatively the first control module 12 may be used to control the drive IC 11 to transmit an enable signal to the power management IC 12 to turn on the power management IC 12.

The receiving module 14 may be used to receive identification information transmitted by the power management IC 12.

The second control module 16 may be used to generate a control signal according to the identification information and to control the drive IC 11 to transmit the control signal to the power management IC 12 to control the power management IC 12 to supply power to the drive IC 11.

Figure 7:
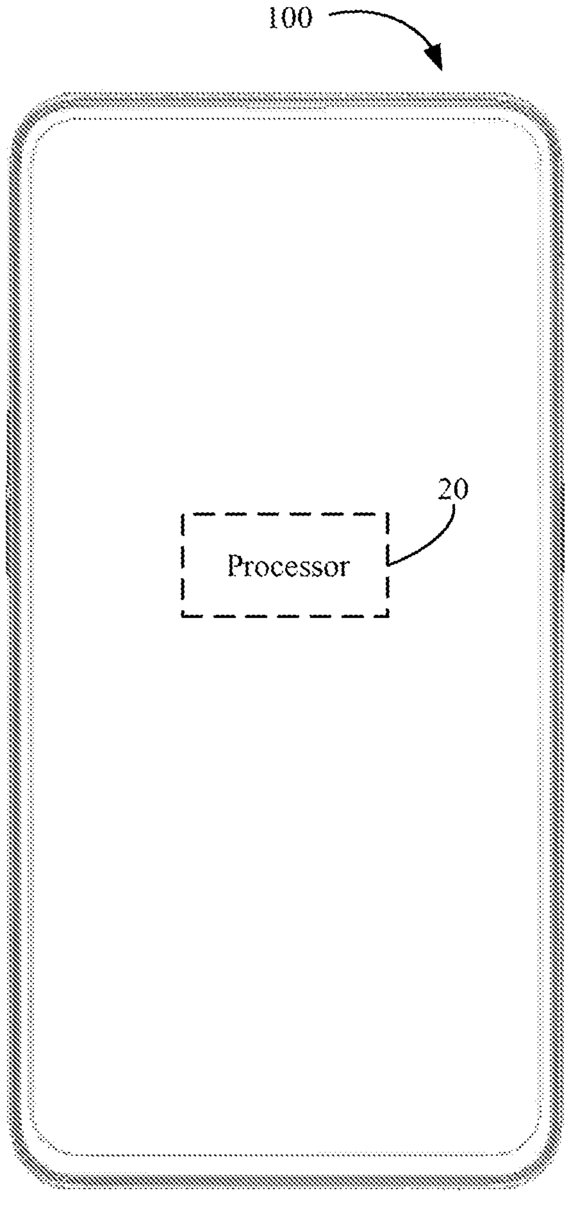
FIG. 7 is a schematic view of modules of an electronic device according to some implementations of the present application.

Referring to FIG. 7, an electronic device 100 is provided in an implementation of the present application, and the control method of the present application can be accomplished by the electronic device 100. The electronic device 100 includes a processor 20.

The processor 20 may be used to control the drive IC 11 to transmit an enable signal to the power management IC 12 to turn on the power management IC 12. The processor 20 may also be used to receive the identification information transmitted by the power management IC 12 and to generate a control signal according to the identification information and to control the drive IC 11 to transmit the control signal to the power management IC 12 to control the power management IC 12 to supply power to the drive IC 11.

Figure 8:
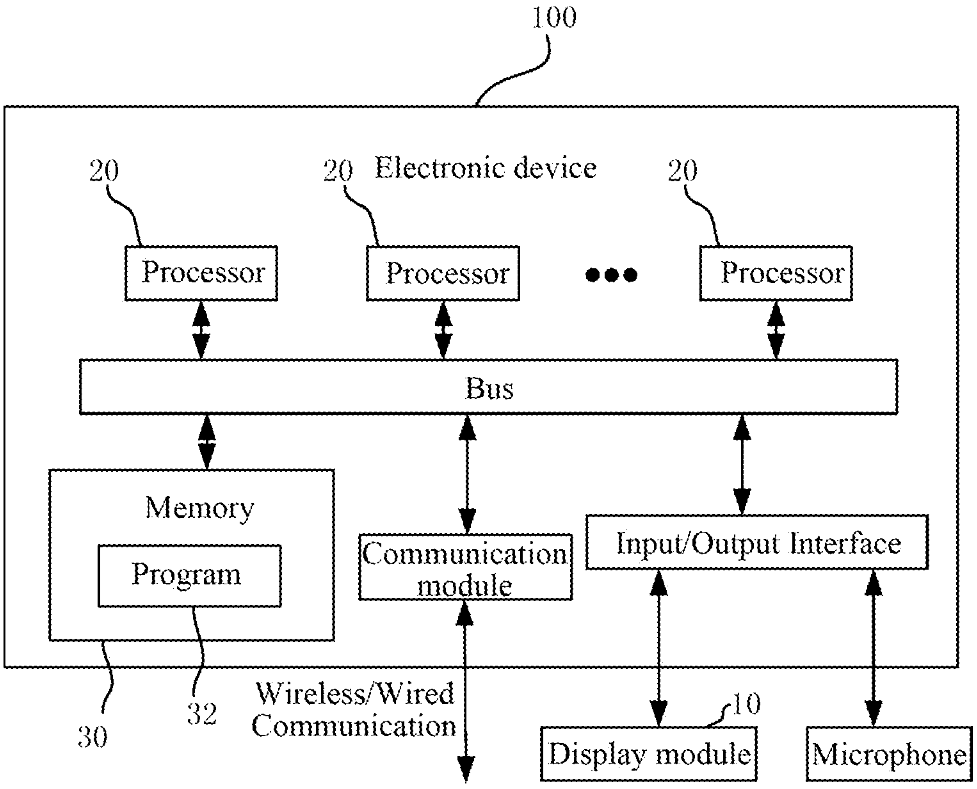
FIG. 8 is another schematic diagram of modules of an electronic device according to some implementations of the present application.

Referring to FIG. 8, the present application provides an electronic device 100 including a display module 10, one or more processors 20, a memory 30, and one or more programs 32 which are stored in memory 30 and executed by one or more processors 20 by which the programs 32 execute instructions that control the method.

Figure 9:
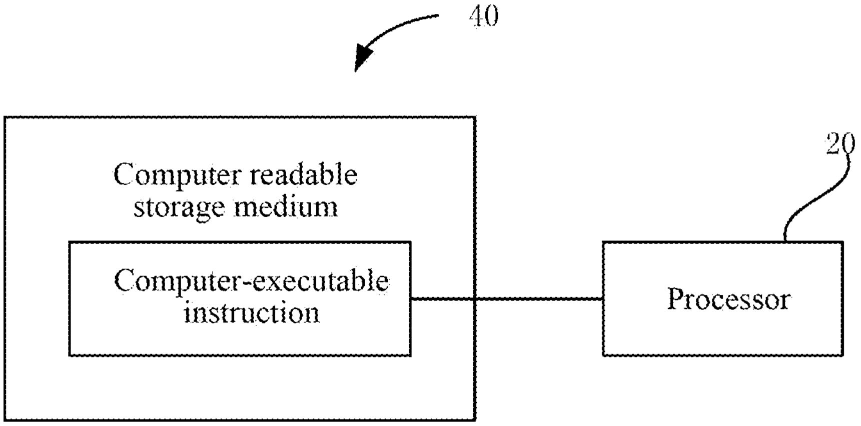
FIG. 9 is a schematic diagram of a connection between a processor and a computer readable storage medium according to some implementations of the present application.

Referring to FIG. 9, the present application provides a non-volatile computer-readable storage medium 40 containing computer-executable instructions that, when executed by one or more processors 20, cause the processor 20 to perform a control method.

In the control method, the control apparatus 200, the electronic device 100 and the computer readable storage medium 40 in these implementations, the power management IC 12 is activated by controlling the drive IC 11 to transmit an enable signal to the power management IC 12, the power management IC 12 can transmit an identification signal to the drive IC 11 after activated, so that the drive IC 11 is paired with the power management IC 12 according to the identification signal, and controls the drive IC 11 to transmit a corresponding control signal according to the identification signal, so that the power management IC 12 supplies power to the drive IC 11. In this way, the drive IC 11 and the power management IC 12 are paired, so that the drive IC 11 and the power management IC 12 work normally, the incompatibility between the power management IC 12 and the drive IC 11 produced by different manufacturers is avoided, the risk of the supply chain is reduced, and the cost is saved.

In some implementations, the electronic device 100 may be a mobile phone, a tablet computer, a smart wearable device (smart watch, smart bracelet, smart helmet, smart glasses, etc.), a virtual reality device, or a head display device. For example, the electronic device 100 in FIG. 7 is a mobile phone.

In some implementations, the control apparatus 200 may be part of the electronic device 100. In other words, the electronic device 100 includes the control apparatus 200.

In some implementations, the control apparatus 200 may be a discrete component assembled in a manner to have the aforementioned functionality, or an IC having the aforementioned functionality in the form of an integrated circuit, or a computer software code segment that enables the computer to have the aforementioned functionality while running on the computer.

In some implementations, the control apparatus 200, as hardware, may be attached to the computer or computer system independently or as an additional peripheral element. The control apparatus 200 may also be integrated into a computer or computer system. For example, when the control apparatus 200 is part of the electronic device 100, the control apparatus 200 may be integrated into the processor 20.

In some implementations where the control apparatus 200 is part of the electronic device 100, the corresponding code segment, as software, of the control apparatus 200 may be stored on the memory 30 and executed on the processor 20 to implement the aforementioned functions. Alternatively, the control apparatus 200 includes one or more of the aforementioned programs or the one or more of the aforementioned programs includes the control apparatus 200.

In some implementations, the computer-readable storage medium 40 may be a storage medium built into the electronic device 100, such as a memory 30, or a storage medium pluggable to the electronic device 100, such as an SD card.

Specifically, in the process of connecting the drive IC 11 to the power management IC 12, the processor 20 may control the enable pin 111 to transmit an enable signal to the power management IC 12, so that the power management IC 12 can be activated, so that the power management IC 12 transmits an identification signal to the second identification pin 112 through the first identification pin 121. After the second identification pin 112 receives the identification signal, the processor 20 may generate a corresponding control signal based on the identification information, and controls the control signal transmitting pin 114 to transmit the control signal to the control signal receiving pin 122. Upon receipt of the control signal by the control signal receiving pin 122, the power management IC 12 can adjust the output voltage of the power supply pin 123 corresponding to each pulse signal to the output voltage corresponding to the quantity of pulses in the LUT according to the pulse quantity of each pulse signal in the control signal, so that the power supply pin 123 can supply power to the drive IC 11 with the adjusted output voltage.

In the description of the specification, references like "an implementation", "some implementations", "schematic implementation", "an example", "a specific example" or "some examples" intend to indicate that specific features, structures, materials, or characteristics described in connection with the implementation or example is associated with at least one implementation or example of the present application. In this specification, schematic reference of the above terms is not necessarily directed to the same implementation or example. Moreover, the specific features, structures, materials, or characteristics described may be combined in any one or more implementations or examples in a proper way.

Although the specific implementations of the present application have been illustrated and described, those of ordinary skill in the art will understand that various changes, modifications, substitutions and variations can be made to these implementations without departing from the principles and concept of the present application. The scope of the present application is defined by the claims and their equivalents.

The invention claimed is:

1. A display module, comprising a drive integrated circuit (IC) and a power management IC, wherein:

the power management IC comprises a first identification pin, and the first identification pin is connected to the drive IC;

when the power management IC is turned on, the power management IC transmits identification information to the drive IC through the first identification pin to enable the drive IC to identify the power management IC and pair with the power management IC;

the identification information is first pulse signals, and the drive IC is configured to determine a type or a brand of the power management IC connected to the drive IC based on a quantity of pulses in the first pulse signals;

the drive IC comprises a plurality of storage registers corresponding to a plurality of power management ICs respectively, each of the plurality of power management IC comprises a first Look Up Table (LUT); each of the storage registers stores a second Look Up Table (LUT) paired with a corresponding first LUT of the power management IC;

in a process of pairing the drive IC with the power management IC, the drive IC is configured to identify the power management IC according to the identification information and select the second LUT in a corresponding storage register to pair with the first LUT of the power management IC;

the drive IC further comprises a control signal transmitting pin connected to the power management IC, and the drive IC is configured to generate a control signal according to the identification information of the power management IC and transmit the control signal to the power management IC through the control signal transmitting pin;

the control signal comprises a plurality of successive pulse signals, each of the plurality of successive pulse signals comprises a predetermined quantity of pulses; the plurality of successive pulse signals corresponds to a plurality of power supply pins of the power management IC respectively, and each of the plurality of successive pulse signals controls an output voltage of a corresponding power supply pin of the plurality of power supply pins;

the first LUT in each power management IC comprises a mapping relationship between the quantity of pulses of each of the plurality of successive pulse signals of the control signal and the output voltage of each power supply pin of the plurality of power supply pins;

the power management IC is configured to adjust the output voltage of a corresponding power supply pin to match a voltage corresponding to the quantity of pulses in the first LUT according to the quantity of pulses in each of the plurality of successive pulse signals; and the power supply pin is configured to supply power to the drive IC with the adjusted output voltage.

2. The display module of claim 1, wherein the drive IC further comprises:

an enable pin, which is connected with the power management IC, wherein the drive IC transmits an enable signal to the power management IC through the enable pin to turn on the power management IC.

3. The display module of claim 2, wherein the drive IC further comprises a second identification pin, which is connected to the first identification pin and is used to receive the identification information transmitted by the first identification pin.

4. The display module of claim 1, wherein the power management IC determines the output voltage of each of the power supply pins according to the control signal and supplies power to the drive IC through the power supply pins.

5. A control method for controlling the pairing of a drive IC and a power management IC, comprising:

controlling the drive IC to transmit an enable signal to the power management IC to turn on the power management IC;

receiving identification information transmitted by the power management IC; and generating a control signal according to the identification information and controlling the drive IC to transmit the control signal to the power management IC to control the power management IC to supply power to the drive IC, wherein:

the identification information is first pulse signals, and the drive IC is configured to determine a type or a brand of the power management IC connected to the drive IC based on a quantity of pulses in the first pulse signals;

the drive IC comprises a plurality of storage registers corresponding to a plurality of power management ICs respectively, each of the plurality of power management IC comprises a first Look Up Table (LUT); each of the storage registers stores a second Look Up Table (LUT) paired with a corresponding first LUT of the power management IC;

in a process of pairing the drive IC with the power management IC, the drive IC is configured to identify the power management IC according to the identification information and select the second LUT in a corresponding storage register to pair with the first LUT of the power management IC;

the drive IC further comprises a control signal transmitting pin connected to the power management IC, and the drive IC is configured to generate the control signal according to the identification information of the power management IC and transmit the control signal to the power management IC through the control signal transmitting pin;

the control signal comprises a plurality of successive pulse signals, each of the plurality of successive pulse signals comprises a predetermined quantity of pulses; the plurality of successive pulse signals corresponds to a plurality of power supply pins of the power management IC respectively, and each of the plurality of successive pulse signals controls an output voltage of a corresponding power supply pin of the plurality of power supply pins;

the first LUT in each power management IC comprises a mapping relationship between the quantity of pulses of each of the plurality of successive pulse signals of the control signal and the output voltage of each power supply pin of the plurality of power supply pins;

the power management IC is configured to adjust the output voltage of a corresponding power supply pin to match a voltage corresponding to the quantity of pulses in the first LUT according to the quantity of pulses in each of the plurality of successive pulse signals, and the power supply pin is configured to supply power to the drive IC with the adjusted output voltage.

6. An electronic device, comprising a display module, one or more processors, a memory; and one or more programs, which are stored in the memory and executed by the one or more processors, wherein the programs comprise instructions for executing the control method of claim 5.

7. A non-volatile computer-readable storage medium comprising computer-executable instructions, characterized in that when the computer-executable instructions are executed by one or more processors, the processors are caused to perform the control method of claim 5.

8. A control apparatus for controlling the pairing of a drive IC and a power management IC, comprising:

a first control module, which controls the drive IC to transmit an enable signal to the power management IC to turn on the power management IC;

a receiving module, which is used to receive identification information transmitted by the power management IC; and a second control module, which is used to generate a control signal according to the identification information and control the drive IC to transmit the control signal to the power management IC to control the power management IC to supply power to the drive IC, wherein:

the identification information is first pulse signals, and the drive IC is configured to determine a type or a brand of the power management IC connected to the drive IC based on a quantity of pulses in the first pulse signals;

the drive IC comprises a plurality of storage registers corresponding to a plurality of power management ICs respectively, each of the plurality of power management IC comprises a first Look Up Table (LUT); each of the storage registers stores a second Look Up Table (LUT) paired with a corresponding first LUT of the power management IC;

in a process of pairing the drive IC with the power management IC, the drive IC is configured to identify the power management IC according to the identification information and select the second LUT in a corresponding storage register to pair with the first LUT of the power management IC;

the drive IC further comprises a control signal transmitting pin connected to the power management IC, and the drive IC is configured to generate the control signal according to the identification information of the power management IC and transmit the control signal to the power management IC through the control signal transmitting pin;

the control signal comprises a plurality of successive pulse signals, each of the plurality of successive pulse signals comprises a predetermined quantity of pulses; the plurality of successive pulse signals corresponds to a plurality of power supply pins of the power management IC respectively, and each of the plurality of successive pulse signals controls an output voltage of a corresponding power supply pin of the plurality of power supply pins;

the first LUT in each power management IC comprises a mapping relationship between the quantity of pulses of each of the plurality of successive pulse signals of the control signal and the output voltage of each power supply pin of the plurality of power supply pins;

the power management IC is configured to adjust the output voltage of a corresponding power supply pin to match a voltage corresponding to the quantity of pulses in the first LUT according to the quantity of pulses in each of the plurality of successive pulse signals; and the power supply pin is configured to supply power to the drive IC with the adjusted output voltage.

* * * * *